US012338953B2

(12) United States Patent
O'Brian et al.

(10) Patent No.: US 12,338,953 B2
(45) Date of Patent: Jun. 24, 2025

(54) MULTI-CHAMBER VESSEL

(71) Applicant: Worthington Industries, Inc., Columbus, OH (US)

(72) Inventors: Jennifer Marie O'Brian, Plain City, OH (US); Pedro Alexandre Queirós Oliveira Silva Vieira, Matosinhos (PT); João Pedro Oliveira Pinhão Silva Mendes, Nogueira Braga (PT); Michael John Graykowski, Jr., Worthington, OH (US); Sarah Amalia Lacey, Clarkston, MI (US)

(73) Assignee: WORTHINGTON ENTERPRISES, INC., Columbus, OH (US)

( * ) Notice: Subject to any disclaimer, the term of this patent is extended or adjusted under 35 U.S.C. 154(b) by 43 days.

(21) Appl. No.: 18/170,916

(22) Filed: Feb. 17, 2023

(65) Prior Publication Data

US 2024/0280223 A1 Aug. 22, 2024

(51) Int. Cl.
*F17C 13/04* (2006.01)

(52) U.S. Cl.
CPC ...... *F17C 13/04* (2013.01); *F17C 2201/0185* (2013.01); *F17C 2203/0604* (2013.01); *F17C 2205/0397* (2013.01)

(58) Field of Classification Search
CPC ................ F17C 13/04; F17C 2203/012; F17C 2203/0604; F17C 2205/0397; F17C 2201/0166; F17C 2203/0602
USPC .......................................................... 220/581
See application file for complete search history.

(56) References Cited

U.S. PATENT DOCUMENTS

| | | | | |
|---|---|---|---|---|
| 3,158,296 A * | 11/1964 | Cornelius | B67D 1/045 D34/39 |
| 5,386,925 A * | 2/1995 | Lane | F24D 3/1008 220/721 |
| 8,403,170 B1 * | 3/2013 | Lai | F15B 1/14 220/721 |

(Continued)

FOREIGN PATENT DOCUMENTS

| | | | |
|---|---|---|---|
| TW | M500846 U | 5/2015 | |
| WO | WO-9913263 A1 * | 3/1999 | F17C 1/00 |

(Continued)

OTHER PUBLICATIONS

European Search Report; EP 23220607.8; Mailed Jun. 11, 2024; 9 pages.

*Primary Examiner* — Rafael A Ortiz
(74) *Attorney, Agent, or Firm* — Tucker Ellis LLP

(57) ABSTRACT

A vessel includes a body having an interior surface that defines an interior space. The vessel further includes a flexible membrane located within the interior space of the vessel. The flexible membrane divides the interior space of the vessel into a first chamber and a second chamber. A valve configured to provide selective fluid communication between the first chamber and an exterior of the vessel. The vessel further includes one or more ribs protruding from at least a portion of the interior surface within the first chamber. The one or more ribs create one or more flowpaths configured to allow flow of a contents of the vessel from the first chamber towards an opening of the valve when the flexible membrane is in contact with the one or more ribs. The flexible membrane can include a ribbed structure extending from a surface of the flexible membrane.

19 Claims, 12 Drawing Sheets

(56) References Cited

U.S. PATENT DOCUMENTS

| | | | | |
|---|---|---|---|---|
| 2004/0031800 | A1* | 2/2004 | Wang | B67D 7/0288 220/581 |
| 2010/0084408 | A1* | 4/2010 | Wang | F17C 1/00 220/203.29 |
| 2020/0256512 | A1* | 8/2020 | Mallick | F15B 1/125 |
| 2023/0341093 | A1* | 10/2023 | Mendes | F17C 1/00 |

FOREIGN PATENT DOCUMENTS

| | | | | |
|---|---|---|---|---|
| WO | 2007119224 | | 10/2007 | |
| WO | WO-2017200207 | A1 * | 11/2017 | F17C 1/06 |
| WO | 2018160368 | | 9/2018 | |

* cited by examiner

MULTI-CHAMBER VESSEL

BACKGROUND

Vessels can be used for storage and/or dispensing of gasses, liquefied compressed gasses or liquids. Certain vessels can include multiple internal chambers separated by a flexible membrane, for example, a diaphragm, a bladder, or a bag. Certain vessels can be used for dispensing a contents thereof, including a fluid such as a gas, liquefied compressed gas, or liquid. For example, a first chamber can contain a material and a second chamber can contain a propellant such as a pressurized gas or liquefied compressed gas. When the contents is dispensed from the vessel, the flexible membrane expands into the first chamber and can eventually seal off the dispensing valve. Often, residual contents can remain within the first chamber, for example, trapped within pockets formed between the flexible membrane and the inner wall of the vessel. Improvements to minimize the residual contents left within the vessel are desirable.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

One or more techniques and systems described herein can be utilized to provide a vessel that includes a body having an interior surface that defines an interior space, a flexible membrane located within the interior space of the vessel, where the flexible membrane divides the interior space of the vessel into a first chamber and a second chamber, a valve configured to provide selective fluid communication between the first chamber and an exterior of the vessel, and one or more ribs protruding from at least a portion of the interior surface within the first chamber. The one or more ribs create one or more flow paths configured to allow flow of a contents of the vessel from the first chamber towards an opening of the valve when the flexible membrane is in contact with the one or more ribs.

In an embodiment, the one or more ribs are longitudinally arranged and extend from the opening of the valve along the interior surface.

In an embodiment, the one or more ribs extend from the opening of the valve to a shoulder of the vessel.

In an embodiment, the one or more ribs comprises eight ribs.

In an embodiment, the one or more ribs are a plurality of ribs, and each rib of the plurality of ribs is arranged at a constant angle from its respective neighboring ribs.

In an embodiment, the one or more ribs extend outwards from a center portion proximate to the opening of the valve, wherein the center portion has a reduced depth compared to the one or more ribs.

In an embodiment, the flexible membrane includes a first surface that defines a portion of the first chamber, a second surface that defines a portion of the second chamber, and a ribbed structure extending from the first surface of the flexible membrane.

In an embodiment, the ribbed structure comprises a base portion that includes a plurality of arms extending outwards from a center hub.

In an embodiment, each arm of the plurality of arms includes a widened end at a distal end of the arm, and an elongated portion inward from the widened end.

In an embodiment, the ribbed structure forms one or more channels between neighboring arms, wherein the one or more channels are configured to allow flow of the contents of the vessel from the first chamber towards an opening of the valve.

In an embodiment, the one or more channels have a width of less than or equal to two millimeters.

In an embodiment, the ribbed structure comprises a raised portion extending from each arm of the plurality of arms.

In an embodiment, the raised portions have a maximum width that is less than a diameter of the opening of the valve.

In an embodiment, the ribbed structure further comprises a tapered portion that narrows in width as it extends from the elongated portion to the center hub.

In an embodiment, the ribbed structure is affixed to the first surface of the flexible membrane.

In an embodiment, the ribbed structure is formed as part of the flexible membrane.

In an embodiment, the one or more flow paths created by the one or more ribs are configured to allow flow of the contents of the vessel into the one or more channels formed by the ribbed structure.

In an embodiment, the one or more ribs are integrally formed as part of a liner that is engaged with at least a portion of the interior surface of the vessel within the first chamber.

In an embodiment, the one or more ribs are an insert that engages with at least one of the interior surface of the vessel within the first chamber, or a liner engaged with the interior surface of the vessel within the first chamber.

In an embodiment, each rib of the one or more ribs comprises a plurality of support members extending across a width of the rib.

In an embodiment, each of the support members are spaced progressively further from subsequent support members as the rib extends towards a distal end of the rib.

In an embodiment, each rib of the one or more ribs comprises an inner wall.

In one aspect, a flexible membrane includes a ribbed structure extending from a surface of the flexible membrane, wherein the ribbed structure includes a base portion that includes a plurality of arms extending from a center hub, and a raised portion extends from each arm of the plurality of arms. Each arm of the plurality of arms includes a widened end at a distal end of the arm, and an elongated portion inward from the widened end.

In an embodiment, the ribbed structure forms one or more channels between neighboring arms.

In one embodiment, each arm of the ribbed structure further comprises a tapered portion that narrows in width as it extends from the elongated portion to the center hub.

In one aspect, a liner is configured to engage with at least a portion of an interior surface of a vessel. The liner includes one or more ribs that create one or more flow paths configured to allow flow of a contents of the vessel towards an opening of a valve, and the one or more ribs are longitudinally arranged and extend from a center portion proximate to the opening of the valve.

In one embodiment, the one or more ribs are a plurality of ribs, and each rib of the plurality of ribs is arranged at a constant angle from its respective neighboring ribs.

To the accomplishment of the foregoing and related ends, the following description and drawings set forth certain illustrative aspects and implementations. These are indicative of but a few of the various ways in which one or more aspects may be employed. Other aspects, advantages and novel features of the disclosure will become apparent from the following detailed description when considered in conjunction with the drawings.

DETAILED DESCRIPTION

Figure 1:
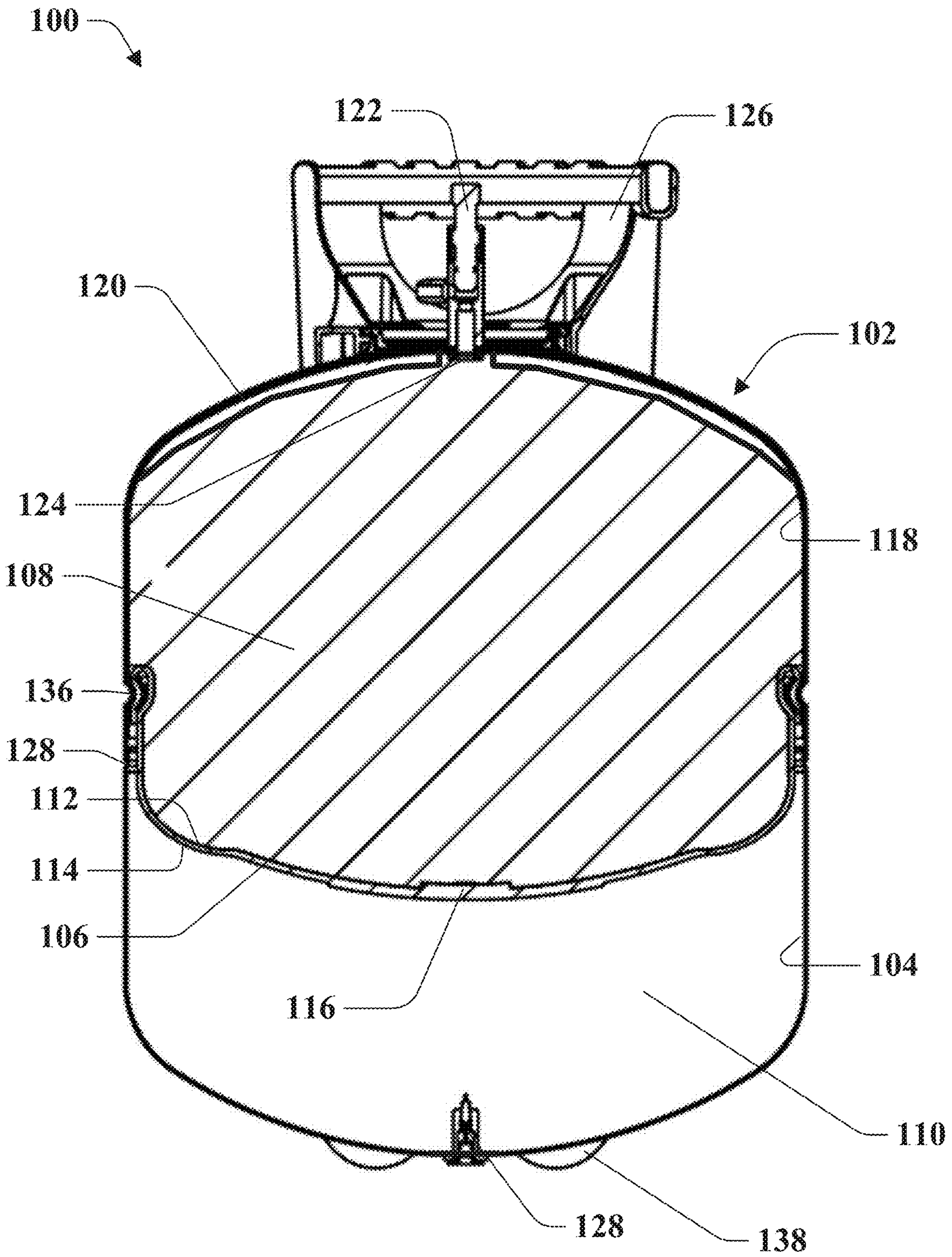
FIG. 1 is a component diagram illustrating an example embodiment of a vessel, where one or more techniques and/or one or more systems described herein may be implemented.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details.

A vessel, as used herein, is defined as any container capable of storing and/or dispensing contents contained within. By way of example and not limitation, a vessel, as used herein, may be a pressure vessel. In other embodiments, the vessel may contain a vacuum.

A vessel can include two or more chambers separated by a flexible membrane such as a diaphragm, a bag, or a bladder. In operation, the vessel can contain a contents in a first chamber and contain a pressurized gas or propellant in a second chamber. While the contents of the first chamber is being dispensed through a valve, the flexible membrane expands into the first chamber. When the flexible membrane contacts a top or side of the vessel, prior art vessels run the risk of having the opening to the valve sealed off, thus trapping a residual amount of the contents of the vessel. The vessel can include one or more ribs configured to protrude from at least a portion of an inside surface of the vessel. The one or more ribs extend from the inside surface of the vessel into the first chamber, and create one or more flow paths configured to allow flow of the contents from the first chamber towards an opening of the valve, even when the flexible membrane expands into the first chamber to the point that the flexible membrane is in contact with the one or more ribs. Further, the flexible membrane can include a ribbed structure that extends from a surface of the flexible membrane into the first chamber. The ribbed structure includes a plurality of arms extending from a center hub, with each arm having a raised portion. Channels are formed between neighboring arms such that as the flexible membrane expands into the first chamber to the point that the flexible membrane contacts the opening of the valve, the ribbed structure contacts at or near the opening of the valve and allows for the contents to flow to the opening of the valve through the channels.

The above features facilitate being able to dispense more of the contents stored within the vessel and prevent the residual contents from becoming trapped within pockets formed between the flexible membrane and the inner wall of the vessel. Various benefits of preventing residual contents from becoming trapped within the vessel are sustainability advantages including reduced waste at the end of product life of the vessel and less mixed materials if the vessel is introduced into a recycling stream. Further, the present features provide cost advantages as less of the vessel's contents is required to meet any dispensing volume expectations by an end user.

Turning now to FIG. 1, a vessel 100 is shown. The vessel 100 can be, for example, a storage tank, a dispensing tank, a bag on valve tank, a bag on valve aerosol can, or an expansion tank such as a diaphragm tank or a bladder tank, among others. Vessel 100 includes a body 102 that can be constructed of any material chosen using sound engineering judgment. By way of example, and not limitation, the body 102 can be constructed using one or more of metal, such as steel or aluminum, carbon fiber, glass fiber, a polymer such as high density polyethylene, a plastic, a composite material, or a combination of such materials. The body 102 includes an interior surface 104 that defines an interior space of the vessel 100.

The vessel 100 can further include a flexible membrane 106 located within the interior space of the vessel 100. The flexible membrane 106 can form distinct chambers within the interior space of the vessel 100. In one embodiment, a first chamber 108 can be at least partially defined by the flexible membrane 106. A second chamber 110 can be at least partially defined by the flexible membrane 106 and a portion of the interior surface 104 of the body 102. It should be appreciated that certain embodiments of the vessel 100 can include additional flexible membranes and/or additional chambers. During normal operation of the vessel 100, the flexible membrane 106 causes the first chamber 108 and the second chamber 110 to be fluidly isolated from each other such that there is no fluid communication between the first chamber 108 and the second chamber 110 within the interior space of the vessel 100. By way of example, and not limitation, the flexible membrane 106 can be constructed from an elastomer (e.g. ethylene propylene diene monomer (EPDM), butyl, nitrile, neoprene or silicone rubber), a film such as a polyester film (e.g. biaxially-oriented polyethylene terephthalate (BoPET)), which may be a single-ply film or a multi-ply film, or a foil. The flexible membrane 106 can include a first surface 112 that defines a portion of the first chamber 108, and a second surface 114 that defines a portion of the second chamber 110. The flexible membrane 106 can include a ribbed structure 116 extending from the first surface 112.

The vessel 100 can further include a liner 118 that engages with at least a portion of the interior surface 104 of the body 102 and creates a barrier between the interior surface 104 of the body 102 and the contents of the first chamber 108. In certain embodiments, the liner 118 is affixed to the interior surface 104 of the body 102. In other embodiments, the liner 118 engages the interior surface 104 of the body 102 as a friction fit. The liner 118 can be made of any suitable material such as polypropylene, high density polypropylene (HDPE), low density polypropylene (LDPE), or polyethylene, among others. The liner 118 can include one or more ribs 120 extending from the liner 118 into the first chamber 108 as described in greater detail hereafter.

The vessel 100 can further include components such as a valve 122 coupled to the vessel 100, and in fluid communication with the first chamber 108. The valve 122 can have an opening 124 within the first chamber 108. A shroud 126 can also encircle the valve 122 to provide protection to the valve 122 and also provide handles for grasping and lifting the vessel 100. A propellant valve 128 can also be coupled to the body 102 to provide a selective fluid communication between the interior space of the vessel 100, such as the second chamber 110 and a source of a propellant used to create a pressure differential between the second chamber 110 and the exterior of the vessel 100 so that a contents of the first chamber 108 can be expelled out of the valve 122. It should be appreciated that the contents of the first chamber 108 can be any material, including a fluid such as a gas, a liquid, or any other composition of matter that can flow. In one embodiment, the propellant valve 128 provides selective fluid communication between the second chamber 110 and a source of a propellant. In this embodiment, the propellant valve 128 can be utilized by a user for filling the second chamber 110 with a pressurized gas such as pressurized air, nitrogen, carbon dioxide, or compressed liquefied gas such as propane, butane or refrigerant, among others. As a user dispenses the contents of the first chamber 108 out through the valve 122, the pressurized gas or compressed liquefied gas expands and causes the flexible membrane 106 to move towards a top surface of the first chamber 108.

Figure 2:
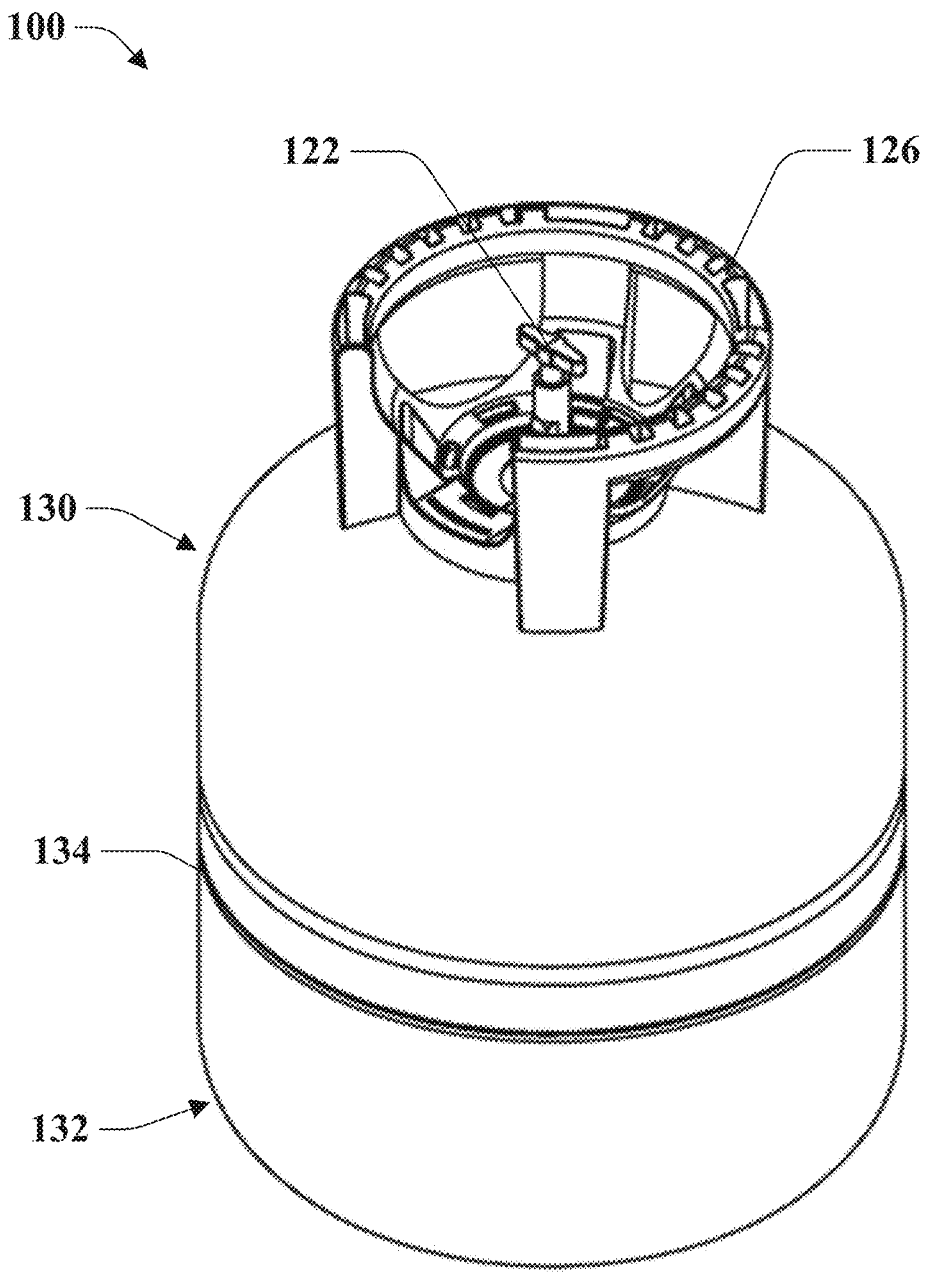
FIG. 2 is a top perspective view of an example embodiment of a vessel.

With further reference to FIG. 2, the body 102 can be constructed from a first portion 130 and a second portion 132 that are connected by, for example, welding, brazing, crimping, or flange. The connection of the first portion 130 and the second portion 132 can create a seam 134. In certain embodiments, the flexible membrane 106 can be crimped to at least one of the first portion 130 or the second portion 132 of the vessel 100 body 102. In certain embodiments, the flexible membrane 106 is crimped between the first portion 130 or the second portion 132, and a crimping ring 136, which extends around the inner circumference of the vessel 100 body 102. In other embodiments, the body 102 of vessel 100 can be seamless.

In certain embodiments, both of the first portion 130 and the second portion 132 include a convex shell and a cylindrical sidewall portion. The first portion 130 can be configured to receive the valve 122, which provides selective fluid communication between the first chamber 108 and the exterior of the body 102. The valve 122 can be used either for filling the vessel 100, dispensing contents of the vessel 100, or both. A shroud 126 can also be mounted to the first portion 130. The second portion 132 can include the propellant valve 122. The second portion 132 can further include a stand 138 such as a footring or plurality of dimples for feet on which the vessel 100 can stand (as shown in FIG. 1). The stand 138 provides balance and support for the vessel 100. It should be appreciated that the vessel 100 can be operable while positioned in any orientation, including with the first portion 130 oriented upwards and the second portion 132 oriented downwards, the first portion 130 oriented downwards and the second portion 132 oriented upwards, or the vessel 100 oriented on its side such that the first portion 130 and the second portion 132 extend along a common horizontal plane.

Figure 3A:
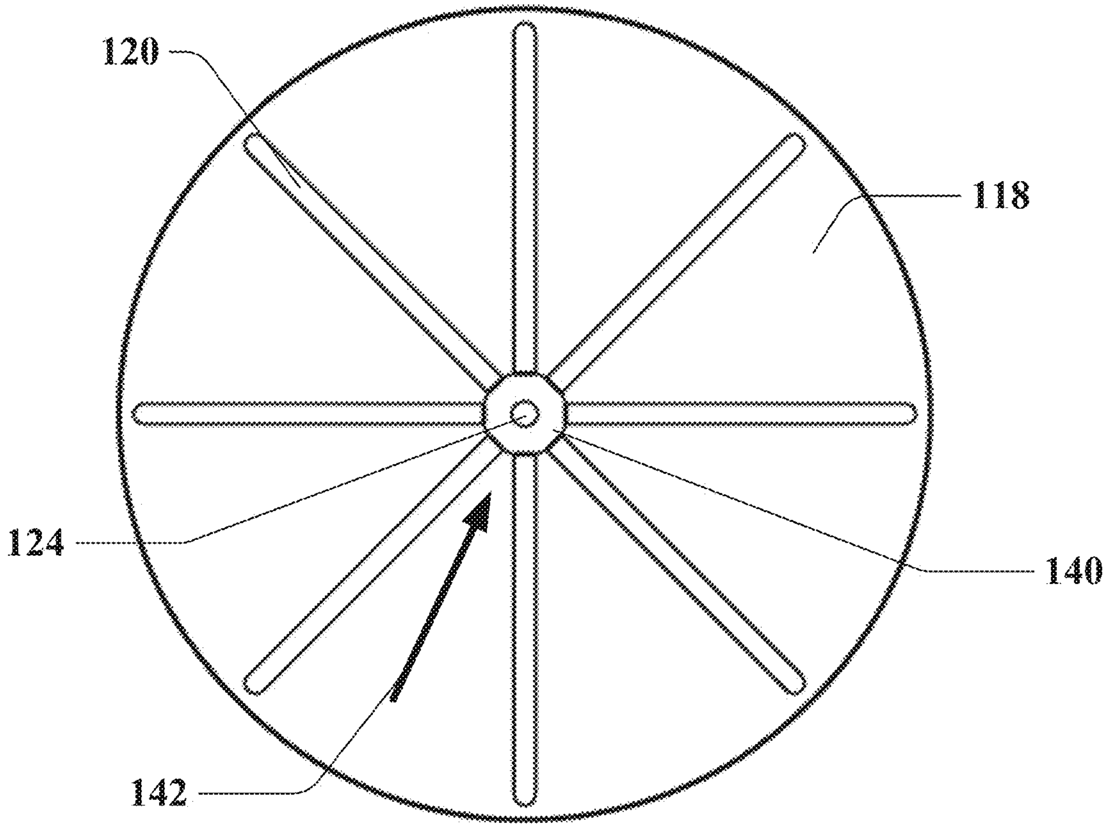
FIG. 3A is an inside bottom view of an exemplary tank liner.

Turning now to FIG. 3A, a bottom view of the inside of an exemplary liner 118 is shown, with one or more ribs 120 extending from an inner surface of the liner 118 into the first chamber 108 of the vessel 100. The one or more ribs 120 can be formed integrally as part of the liner 118, for example, as part of a molding process. In other embodiments, the one or more ribs 120 can be created as a separate insert that can be affixed to the liner 118 or the interior surface 104 of the vessel 100 within the first chamber 108. The one or more ribs 120 can be constructed of any suitable material including, but not limited to, polypropylene or a plastic. It should be appreciated that any embodiments described herein that involve the one or more ribs 120 being part of a liner 118 could also apply to embodiments where the one or more ribs 120 are an insert affixed to a liner or to the interior surface 104 of the vessel 100. The one or more ribs 120 can be longitudinally arranged, extending from the opening 124 of the valve 122 along the contours of the surface of the liner 118 and towards a shoulder of the vessel 100. More specifically, the one or more ribs 120 can extend from an area proximate to the opening 124 of the valve 122 to a shoulder of the vessel 100. In certain embodiments, the one or more ribs 120 can extend outwards from a center portion 140 that has a reduced depth compared to the one or more ribs 120. The center portion 140 can be circular-shaped or polygonal-shaped. The center portion 140 can have a center aperture that corresponds to and provides an opening to the opening 124 of the valve 122. It should be appreciated that the center portion 140 is optionally included, and in certain embodiments, the one or more ribs 120 can instead extend up to the edge of the opening 124 of the valve 122.

Figure 3B:
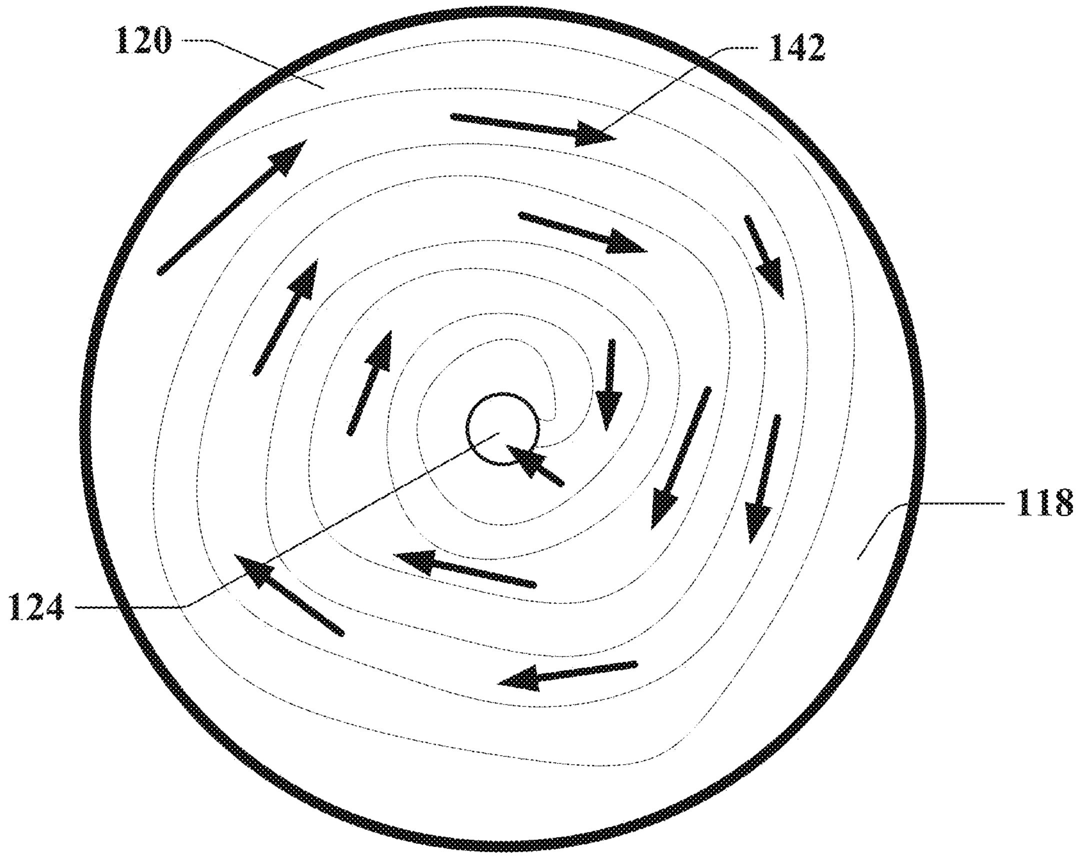
FIG. 3B is an inside bottom view of an exemplary tank liner.

In certain embodiments, each rib 120 of a plurality of ribs 120 is radially arranged at a constant angle from its respective neighboring rib 120. As depicted in FIG. 3A, the one or more ribs 120 include eight ribs 120. In this embodiment, each rib 120 is oriented longitudinally at a 45-degree angle from each neighboring rib 120. It should be appreciated that while FIG. 3A depicts eight ribs 120, the liner 118 can include any number of ribs 120, including more than eight or less than eight. The plurality of ribs 120 are arranged to create one or more flow paths 142 configured to allow flow of contents of the vessel 100 from the first chamber 108 towards the opening 124 of the valve 122. It should also be appreciated that the one or more ribs 120 can also be arranged in a curved pattern, a helical pattern, a zig-zag pattern, among others. The helical pattern is depicted in FIG. 3B, which is a bottom view of the inside of an exemplary liner 118, and includes one rib 120 that creates a helical pattern forming one flow path 142 that leads to the opening

124 of the valve 122. It should be appreciated that the embodiment with the helical pattern can optionally include a center portion 140.

Figure 4A:
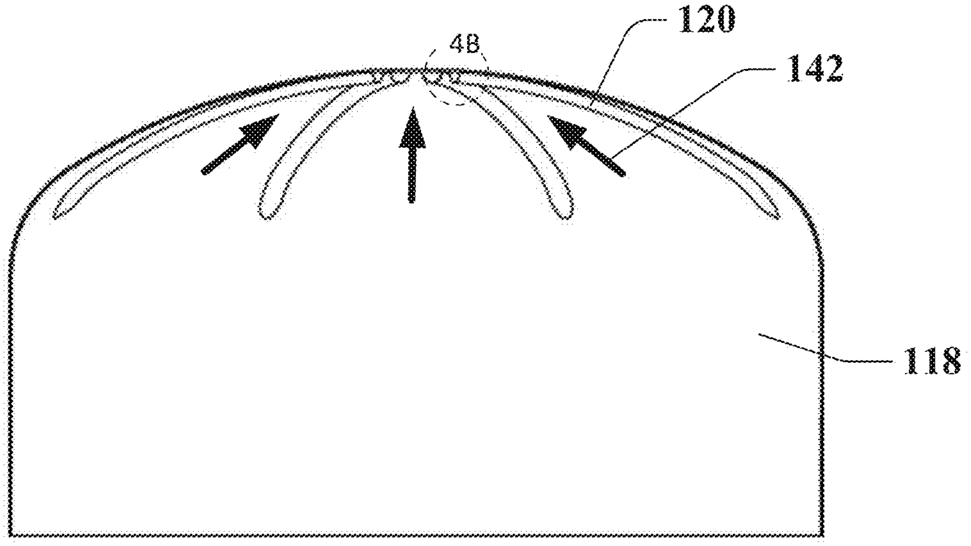
FIG. 4A is cross-sectional view of an exemplary tank liner.
Figure 4B:
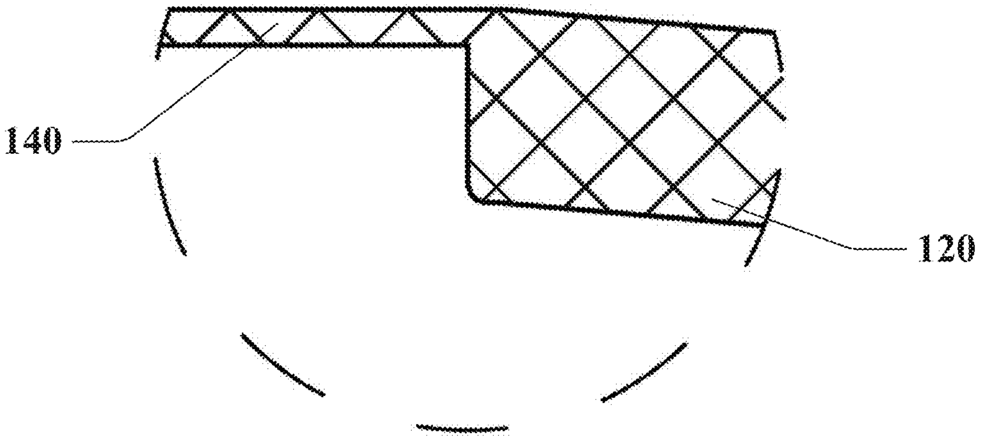
FIG. 4B is an enlarged cross-sectional view of a portion of the exemplary tank liner of FIG. 4A.

Turning now to FIGS. 4A and 4B, the one or more ribs 120 form the one or more flow paths 142 such that the flow paths 142 are configured to allow for the flow of the contents of the vessel from the first chamber 108 towards the opening 124 of the valve 122, even when the flexible membrane 106 is in contact with the one or more ribs 120. When a user dispenses contents of the vessel 100 from the first chamber 108 through the valve 122, the flexible membrane 106 expands into the first chamber 108 towards the opening 124 of the valve 122. As the contents are emptied, the flexible membrane 106 can make contact with the liner 118 at various points surrounding the opening 124 of the valve 122. The flow paths 142 formed by the one or more ribs 120 allow for flow of the contents to the opening 124 of the valve 122 even when the flexible membrane 106 makes contact with the one or more ribs 120.

FIG. 4B depicts a cross-sectional view of a rib 120 at a point where it extends outwards from the center portion 140. As shown, the center portion 140 has a shallower depth than the rib 120. The center portion 140 provides space around the opening 124 of the valve 122, which allows for a less constricted flow of the contents into the opening 124 than if the ribs extended up to the edge of the opening 124, thereby preventing inhibited flow or clogging of the opening 124. In certain embodiments, the one or more ribs 120 can have a depth, as measured from the surface of the liner 118, of approximately 0.1 inches to 0.2 inches, however broader ranges can be used. In one embodiment, the one or more ribs 120 can have a half-circle cross section that is 8 millimeters wide and 4 millimeters deep.

Figure 4C:
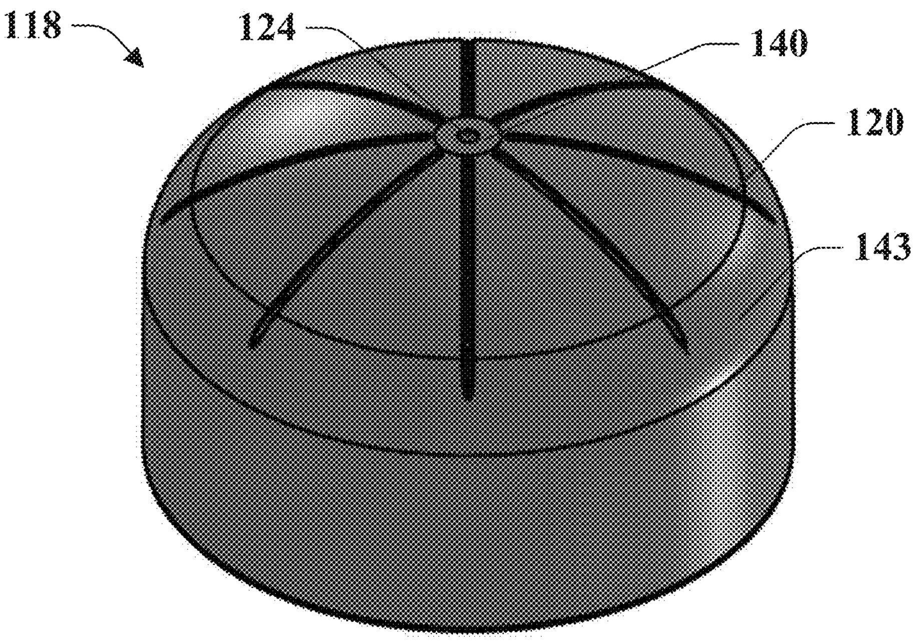
FIG. 4C is a perspective view of an exemplary tank liner.

Turning now to FIG. 4C, an exemplary tank liner 118 having ribs 120 is shown from an above perspective view. Each of the ribs 120 in the liner 118 appear as an indent in the top outer portion of the liner 118. The ribs 120 can extend from the center portion 140 to a shoulder 143 of the liner 118. The shoulder 143 is the transition portion from the rounded top portion of the liner 118 to the cylindrical side portion of the liner 118.

Figure 4D:
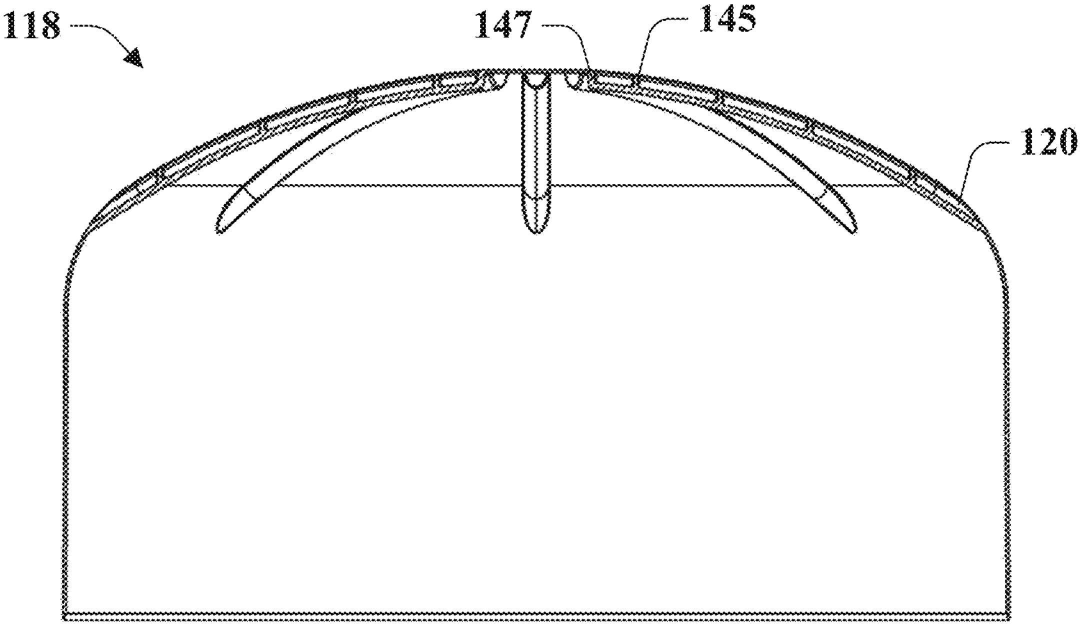
FIG. 4D is a cross-sectional view of an exemplary tank liner.

As shown in FIG. 4D, certain embodiments of the tank liner 118 can have ribs that are hollow with support members 145 extending across the width of each rib 120. The support members 145 can be molded as part of the tank liner 118 and/or ribs 120, and provide rigidity and support to the ribs 120. For example, a semi-circular shaped rib 120 can have one or more support members 145 spanning the diameter of the rib 120. Each rib 120 can have one or more support members 145, where each of the support members 145 are spaced progressively further from subsequent support members 145 as the rib 120 extends from the center portion 140 to the distal end of the rib 120. For example, a first support member 145 closest to the center portion and/or opening 124 of the valve 122 can be spaced from a second support member 145 by a first distance, and the second support member 145 can be spaced from a third support member by a second distance greater than the first distance, and so on.

Figure 4E:
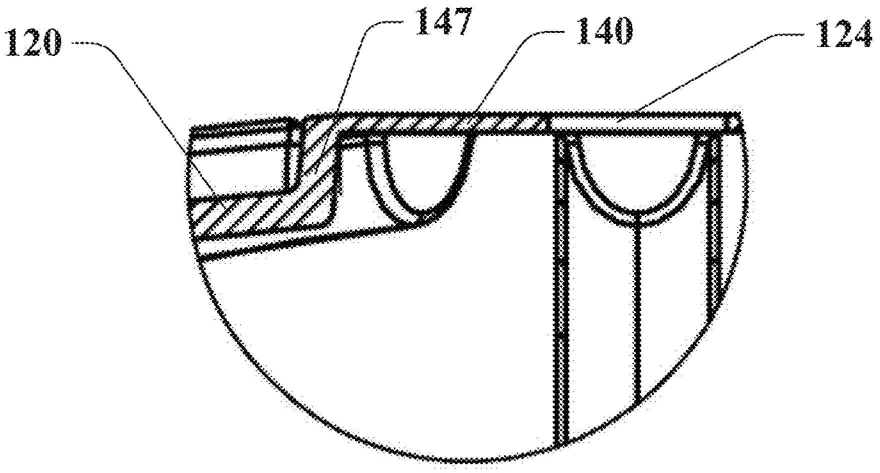
FIG. 4E is an enlarged cross-sectional view of an exemplary tank liner.

As shown in FIG. 4E, each rib 120 can further have an inner wall 147 at the end of the rib 120 closest to the center portion 140 and/or opening 124 of the valve 122. The inner wall 147 encloses the rib 120 at the rib's 120 end to prevent any of the contents of the vessel 100 from leaking into the inside of the ribs 120.

Figure 5:
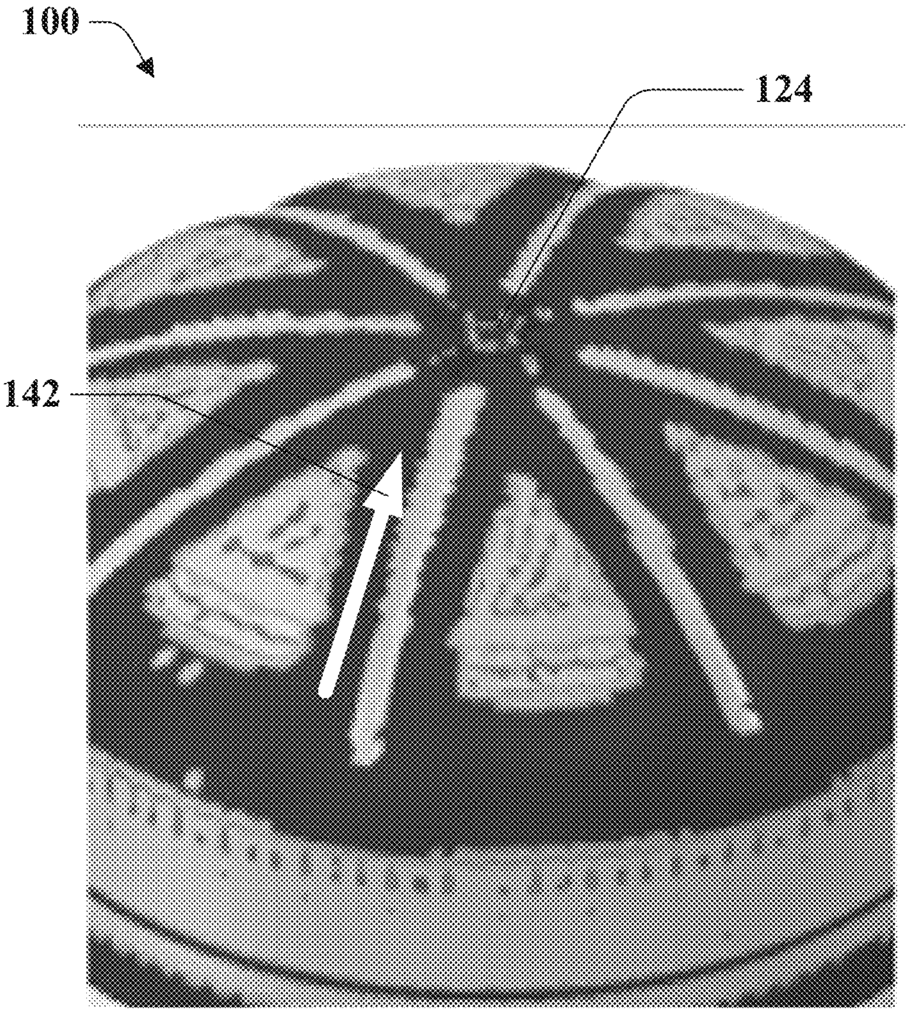
FIG. 5 is a top perspective view of an exemplary embodiment of a vessel showing a computer generated depiction of surface contact.

Turning now to FIG. 5, a computer-generated depiction of a vessel 100 during dispensing of the contents of the vessel 100 is shown. The darker areas indicate surface area of the liner 118 that is not in contact with the flexible membrane 106. The lighter areas indicate surface area of the liner 118 that is in contact with the flexible membrane 106. As shown, each of the eight ribs 120 are in contact with the flexible membrane, as are a portion of the surface area between each rib 120. However, between each rib exists at least one flow path 142 to the opening 124 of the valve 122.

Figure 6:
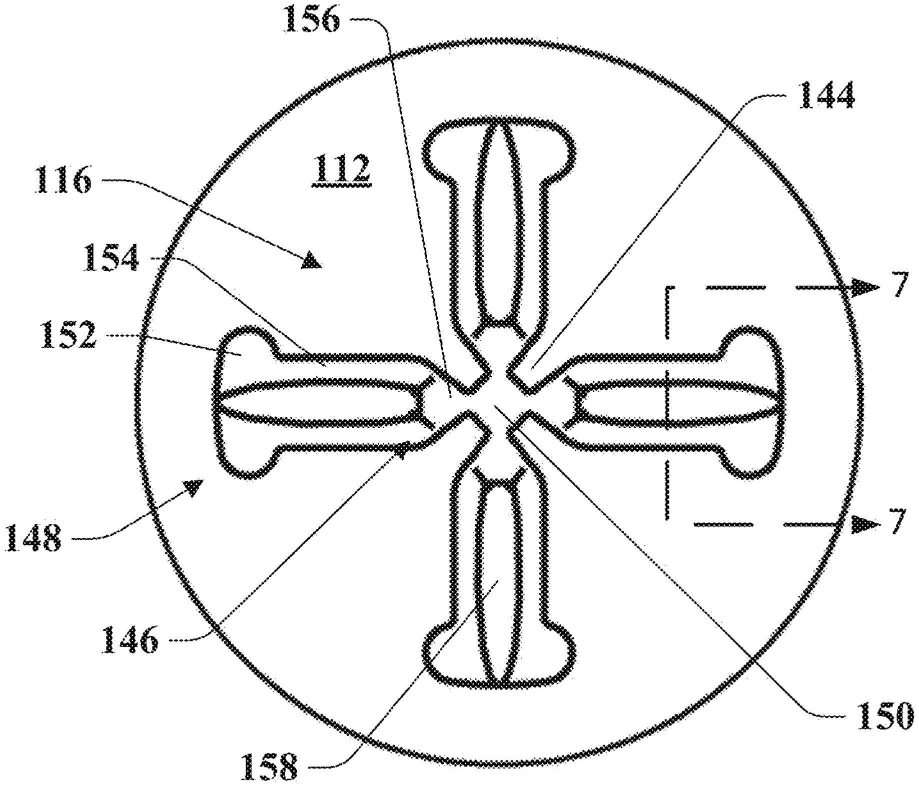
FIG. 6 is top view of an exemplary ribbed structure of a flexible membrane.
Figure 7:
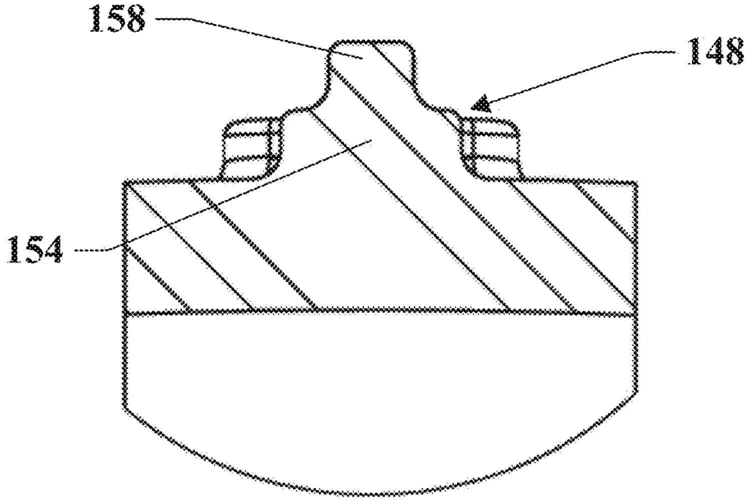
FIG. 7 is a cross-sectional view of the exemplary ribbed structure, taken along the dashed line in FIG. 6.

Turning now to FIGS. 6 and 7, a ribbed structure 116 is shown. In certain embodiments of the vessel 100, the ribbed structure 116 extends from a surface of the flexible membrane 106. In one embodiment, the ribbed structure 116 extends from the first surface 112 of the flexible membrane 106, and into the first chamber 108. The ribbed structure 116 can be made of any suitable material including, but not limited to, a plastic, or a rubber such as butyl or ethylene propylene diene monomer (EPDM) rubber. The ribbed structure 116 can be formed from the same type of material as the flexible membrane 106 or it can be made of a different material as compared to the flexible membrane 106. As described above, the flexible membrane 106 expands into the first chamber 108 towards the opening 124 of the valve 122. While the flexible membrane 106 expands into the first chamber 108, the ribbed structure 116 approaches the opening 124. Instead of the flexible membrane 106 making contact with the liner 118 at, for example, the center portion 140, and sealing off the opening 124, the ribbed structure 116 can make contact with the liner 118 at or near the center portion 140. While the ribbed structure 116 is in contact with the liner 118 at or near the center portion 140, the ribbed structure 116 is configured to provide one or more channels 144 configured to allow for the flow of the contents of the vessel 100 from the first chamber 108 to the opening 124 of the valve 122.

The ribbed structure 116 can include a base portion 146. The base portion 146 includes a plurality of arms 148 extending from a center hub 150. In one embodiment, the ribbed structure 116 includes four arms 148 extending from the center hub 150. Each of the four arms 148 can be arranged at a constant angle from the neighboring arms 148. For example, in an embodiment of the ribbed structure 116 having four arms 148, each arm is arranged at a ninety-degree angle from the neighboring arms 148. Each arm 148 of the plurality of arms 148 can include a widened end 152 at a distal end of the arm 148. Inward of the widened end 152, the arm 148 includes an elongated portion 154. A tapered portion 156 can connect the elongated portion 154 to the center hub 150. The tapered portion 156 narrows in width as it extends from the elongated portion 154 to the center hub 150. The ribbed structure 116 can form the one or more channels 144 between tapered portions 156 of neighboring arms 148. The one or more channels 144 are configured to allow flow of the contents of the vessel 100 from the first chamber 108 towards the opening 124 of the valve 122. In certain embodiments, the one or more channels 144 can have a width of less than or equal to two millimeters.

The ribbed structure 116 can also include a raised portion 158 extending perpendicularly from a top surface of each arm 148 of the plurality of arms 148. The raised portion 158 can have a length that extends over one or more of the widened end 152, the elongated portion 154 and/or the tapered portion 156. In one embodiment, the raised portion 158 has a length that extends over the widened end 152 and the elongated portion 154 of each arm 148. As shown in the cross-sectional view of FIG. 7, the raised portion 158 can have a width that is less than a width of the elongated portion 154 of the arm 148. In certain embodiments, the raised portion 158 can have a width that varies along its length. For example, the raised portion 158 can have a first width along a portion of the raised portion 158 that is positioned over the elongated portion 154 of the arm 148, and can taper in width to a second width at the distal end of the raised portion 158 positioned over the widened end 152. The maximum width of the raised portion 158 is less than a diameter of the opening 124 of the valve 122.

In one embodiment, the ribbed structure 116 can be affixed to the first surface 112 of the flexible membrane 106. For example, an adhesive can be used to adhere the ribbed structure 116 to the first surface 112 of the flexible membrane 106. In another embodiment, the ribbed structure 116 can be formed as an integral part of the flexible membrane 106. For example, the ribbed structure 116 can be molded as part of the first surface 112 of the flexible membrane 106 during the molding process to create the flexible membrane 106.

Figure 8:
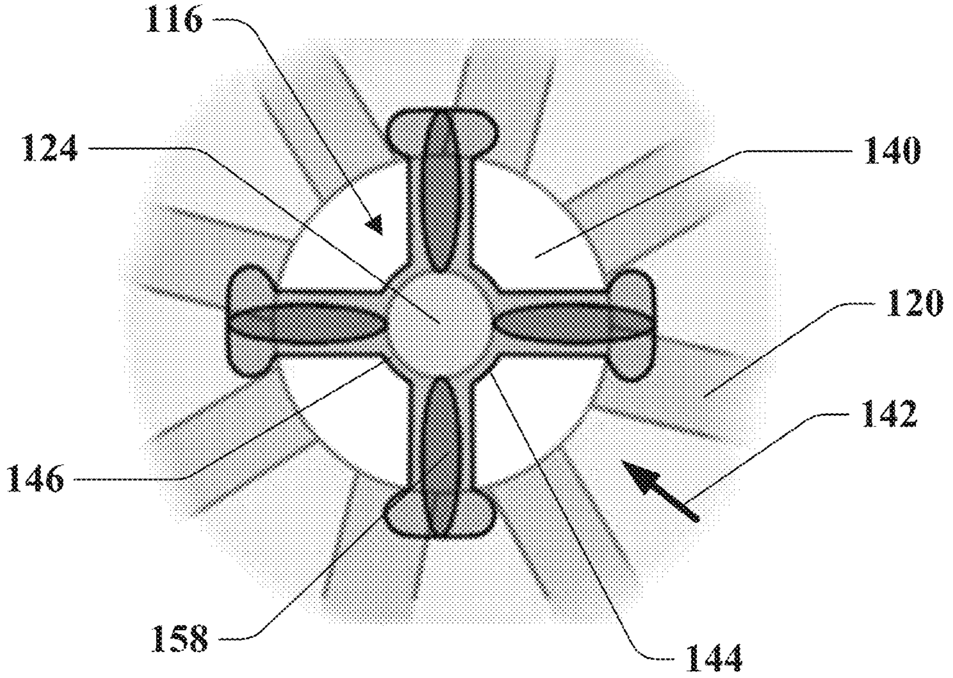
FIG. 8 is an inside bottom view of an exemplary ribbed structure of a flexible membrane.

Turning now to FIG. 8, a view of the ribbed structure 116 is shown from below, looking up towards the opening 124 of the valve 122. Portions of the ribbed structure 116 are shown as transparent so that the positional relationship between the ribbed structure 116 and the liner 118 and opening 124 are apparent. The ribbed structure 116 can be located at or near the center of the first surface 112 of the flexible membrane 106, and extending into the first chamber 108 such that a top surface of the raised portions 158 faces towards the opening 124 of the valve 122. As a user dispenses the contents of the first chamber 108 through the valve 122, the second chamber 110 expands, which causes the flexible membrane 106 to stretch into the space occupied by the first chamber 108. As the flexible membrane 106 stretches into the space occupied by the first chamber 108, the flexible membrane 106 approaches the liner 118 within the first chamber 108.

The ribbed structure 116 can be positioned such that as the flexible membrane 106 approaches the liner 118 within the first chamber 108, the ribbed structure 116 approaches the opening 124 of the valve 122. While the flexible membrane 106 approaches and/or contacts the ribs 120 of the liner 118, the ribbed structure 116 can contact the liner at or near the center portion 140 surrounding the opening 124 of the valve 122. In certain embodiments, the ribbed structure 116 can be positioned on the flexible membrane 106 such that a portion of the ribbed structure 116 contacts one or more of the ribs 120. In certain embodiments, the ribbed structure 116 can be positioned on the flexible membrane 106 such that as the flexible membrane 106 contacts the liner 118, the ribbed structure 116 can nest within or over the center portion 140 surrounding the opening 124 of the valve 122. The one or more flow paths 142 created by the one or more ribs 120 are configured to allow flow of the contents of the vessel 100 into the one or more channels 144 formed by the ribbed structure 116. In this manner, the contents of the first chamber 108 can flow through the flow paths 142, through the one or more channels 144, through the opening 124 of the valve 122, and out through the valve 122, even when the flexible membrane 106 makes contact with the one or more ribs 120 of the liner 118. The ribbed structure 116 and the one or more ribs 120 of the liner 118 are sized and positioned such that each of the flow paths 142 are in fluid communication with at least one of the one or more channels 144 regardless of the rotational position of the ribbed structure 116 is it nests on or over the center portion 140 of the liner 118. It should be appreciated that because FIG. 8 depicts a view of the underside of the ribbed structure 116, the one or more channels 144 are not shown. The raised portion 158 of the ribbed structure 116 has a maximum width that is less than the diameter of the opening 124 so that in case one of the raised portions 158 nests directly over the opening 124 to the valve 122, the raised portion 158 cannot completely cover or seal off the opening 124.

In one embodiment, the one or more ribs 120 can extend from the flexible membrane 106 into the first chamber 108 instead of extending from the liner 118 or the inner surface 104 of the vessel 100. In this embodiment, the one or more ribs 120 can extend outward from a center or a center portion 140, along the surface of the flexible membrane 106. In this embodiment, the one or more ribs 120 form the one or more flow paths 142 to provide flow of the contents of the vessel from the first chamber 108 to the opening 124 of the valve 122 when the one or more ribs 120 contact the inner surface 104 of the vessel 100 or the liner 118 within the first chamber 108. In this embodiment, the ribbed structure 116 can also be included. For example, the ribbed structure 116 can extend from a center of the flexible membrane 106 into the first chamber 108 and the one or more ribs 120 can extend outwards from the ribbed structure 116. In this embodiment, the one or more ribs 120 can be integrally formed as part of the flexible membrane 106 or the one or more ribs 120 can be formed as an insert and affixed to the flexible membrane 106.

As an additional feature to prevent the premature sealing of the opening 124 of the valve 122, the flexible membrane 106 can be constructed such that more material is used to construct the center of the flexible membrane 106 (e.g. proximate to the ribbed structure 116) than at the edges of the flexible membrane 106. In other words, the flexible membrane 106 can be thicker and/or more dense towards the center than at the outside. As a result, the center of the flexible membrane 106 is more rigid than the outside and expands towards the opening 124 of the valve 122 slower than the outer portions of the flexible membrane 106 as a user dispenses the contents of the first chamber 108, thus further ensuring that the flexible membrane 106 does not seal the opening 124 before most or all of the contents of the first chamber 108 is dispensed.

Figure 9:
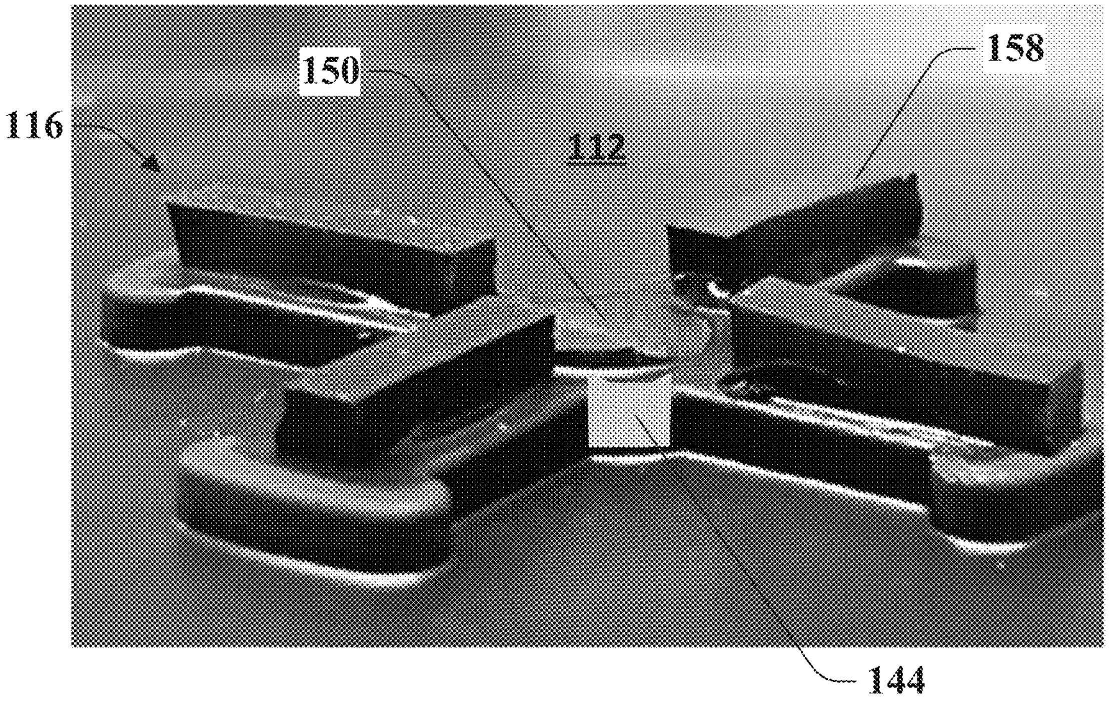
FIG. 9 is a perspective view of an exemplary ribbed structure of a flexible membrane.

FIG. 9 depicts one embodiment of the ribbed structure 116 on the first surface 112 of the flexible membrane 106. In this embodiment, the ribbed structure 116 is formed as part of the molding process that creates the flexible membrane 106. The molding process results in a sprue projecting from a portion of the ribbed structure 116, for example, projecting from the center hub 150. As part of the manufacturing process for the flexible membrane 106 and the ribbed structure 116, the sprue is trimmed to the surface level of the center hub 150. However, as a fail-safe measure to prevent sealing or blockage of the opening 124 of the valve 122, a sprue hole diameter can be used that is smaller than the inner diameter of the opening 124 of the valve 122. As a result, even if the resulting sprue projection is not trimmed properly or at all, the sprue cannot completely plug the opening 124 of the valve 122. Alternatively, a plurality of sprue holes can be used during the molding process, where the plurality of sprue holes are located off-center.

Figure 10:
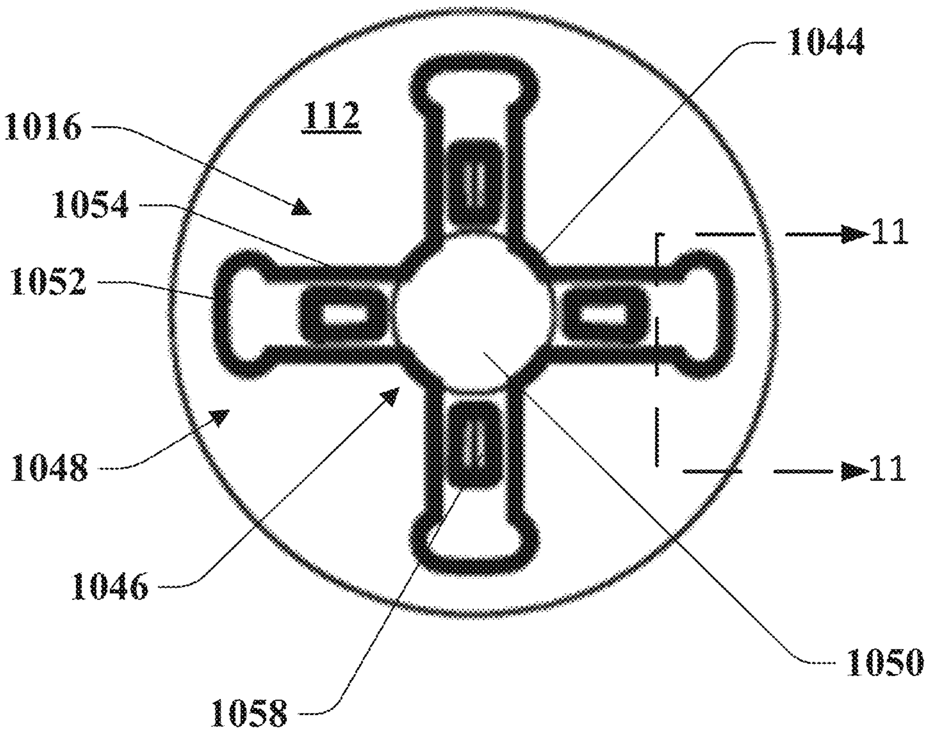
FIG. 10 is top view of an exemplary ribbed structure of a flexible membrane.
Figure 11:
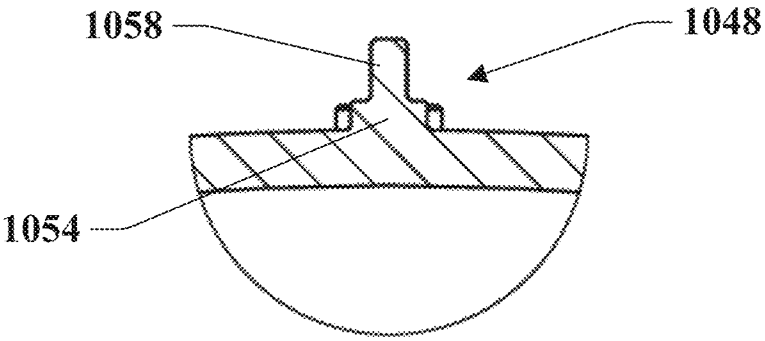
FIG. 11 is a cross-sectional view of the exemplary ribbed structure, taken along the dashed line in FIG. 10.

Turning now to FIGS. 10-11, an exemplary embodiment of the ribbed structure is shown at 1016. The ribbed structure 1016 is substantially the same as the above-referenced ribbed structure 116, and consequently the same reference numerals but indexed by 1000 are used to denote structures corresponding to similar structures in the ribbed structures. In addition, the foregoing description of the ribbed structure 116 is equally applicable to the ribbed structure 1016 except as noted below. The ribbed structure 1016 can include a base portion 1046. The base portion 1046 includes a plurality of arms 1048 extending from a center hub 1050. In one embodiment, the ribbed structure 1016 includes four arms 1048 extending from the center hub 1050. Each of the four arms 1048 can be arranged at a constant angle from the neighboring arms 1048. For example, in an embodiment of the ribbed structure 1016 having four arms 1048, each arm 1048 is arranged at a ninety-degree angle from the neighboring arms 1048. Each arm 1048 of the plurality of arms 1048 can include a widened end 1052 at a distal end of the arm 1048. Inward of the widened end 1052, the arm 1048 includes an elongated portion 1054 that can extend to the center hub 1050. The ribbed structure 1016 can form one or more channels 1044 between neighboring arms 1048. The one or more channels 1044 are configured to allow flow of the contents of the vessel 100 from the first chamber 108 towards the opening 124 of the valve 122. In certain embodiments, the one or more channels 1044 can have a width of less than or equal to two millimeters.

The ribbed structure 1016 can also include a raised portion 1058 extending perpendicularly from a top surface of each arm 1048 of the plurality of arms 1048. The raised portion 1058 can have a length that extends over one or more of the widened end 1052 and/or the elongated portion 1054. In the ribbed structure 1016 shown in FIG. 10, the raised portion 1058 has a length that extends over a portion of the elongated portion 1054 of each arm 1048. As shown in the cross-sectional view of FIG. 11, the raised portion 1058 can have a width that is less than a width of the elongated portion 1054 of the arm 1048. In certain embodiments, the maximum width of the raised portion 1058 is less than a diameter of the opening 124 of the valve 122.

Figure 12:
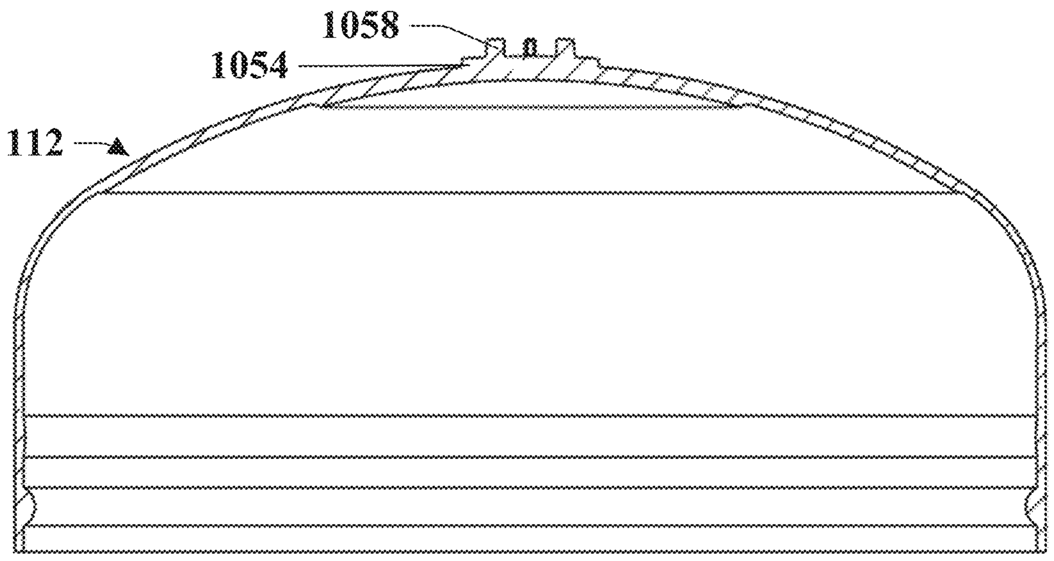
FIG. 12 is a cross sectional view of an exemplary flexible membrane
Figure 13:
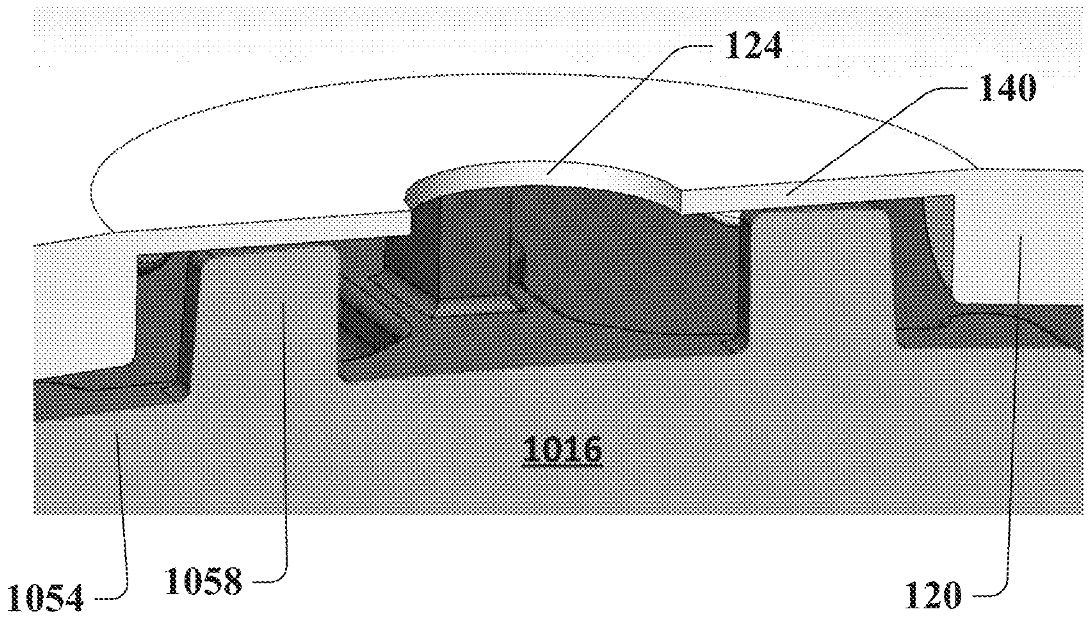
FIG. 13 is a cross sectional view of an exemplary ribbed structure interacting with a liner.

FIG. 12 depicts a cross-section of the ribbed structure 1016 extending from a top of the first surface 112 of the flexible membrane 106. As shown in in FIG. 13, the ribbed structure 1016 can be positioned such that as the flexible membrane 106 approaches the liner 118 within the first chamber 108, the ribbed structure 1016 approaches the opening 124 of the valve 122. While the flexible membrane 106 approaches and/or contacts the ribs 120 of the liner 118, the ribbed structure 1016 can contact the liner at or near the center portion 140 surrounding the opening 124 of the valve 122. For example, ribbed structure 1016 can be positioned on the flexible membrane 106 such that as the flexible membrane 106 contacts the liner 118, the ribbed structure 1016 can nest within or over the center portion 140 surrounding the opening 124 of the valve 122. In this position, the raised portions 1058 extend into the center portion 140 while the elongated portion 1054 and/or the widened end 1052 of each arm 1048 contact a top surface of the one or more ribs 120. It should be appreciated that depending on the height of the raised portions 1058, the elongated portion 1054 and/or the widened end 1052 may be separated from the top surface of the one or more ribs 120 by a distance while the raised portions 1058 are nested within the center portion 140.

Moreover, the word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, "at least one of A and B", or "at least one of A or B" and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features, ranges, and acts described above are disclosed as example forms of implementing the claims.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A vessel, comprising:

a body comprising an interior surface that defines an interior space;

a flexible membrane located within the interior space of the vessel, wherein the flexible membrane divides the interior space of the vessel into a first chamber and a second chamber;

a valve configured to provide selective fluid communication between the first chamber and an exterior of the vessel; and one or more ribs protruding from at least a portion of the interior surface within the first chamber, wherein the one or more ribs create one or more flow paths configured to allow flow of a contents of the vessel from the first chamber towards an opening of the valve when the flexible membrane is in contact with the one or more ribs, wherein the one or more ribs extend outwards from a center portion proximate to the opening of the valve, wherein the center portion has a reduced depth compared to the one or more ribs.

2. The vessel of claim 1, wherein the one or more ribs are longitudinally arranged and extend from the opening of the valve along the interior surface.

3. The vessel of claim 1, wherein the one or more ribs extend from the opening of the valve to a shoulder of the vessel.

4. The vessel of claim 1, wherein the one or more ribs comprises eight ribs.

5. The vessel of claim 1, wherein the one or more ribs are a plurality of ribs, and each rib of the plurality of ribs is arranged at a constant angle from its respective neighboring ribs.

6. The vessel of claim 1, wherein the flexible membrane comprises:
- a first surface that defines a portion of the first chamber;
- a second surface that defines a portion of the second chamber; and
- a ribbed structure extending from the first surface of the flexible membrane.

7. The vessel of claim 1, wherein the one or more ribs are integrally formed as part of a liner that is engaged with at least a portion of the interior surface of the vessel within the first chamber.

8. The vessel of claim 1, wherein each rib of the one or more ribs comprises a plurality of support members extending across a width of the rib.

9. A vessel, comprising:
- a body comprising an interior surface that defines an interior space;

a flexible membrane located within the interior space of the vessel, wherein the flexible membrane divides the interior space of the vessel into a first chamber and a second chamber, and wherein the flexible membrane comprises:
- a first surface that defines a portion of the first chamber;
- a second surface that defines a portion of the second chamber; and
- a ribbed structure extending from the first surface of the flexible membrane, wherein the ribbed structure comprises a base portion that includes a plurality of arms extending outwards from a center hub;
- a valve configured to provide selective fluid communication between the first chamber and an exterior of the vessel; and
- one or more ribs protruding from at least a portion of the interior surface within the first chamber, wherein the one or more ribs create one or more flow paths configured to allow flow of a contents of the vessel from the first chamber towards an opening of the valve when the flexible membrane is in contact with the one or more ribs.

10. The vessel of claim 9, wherein each arm of the plurality of arms includes a widened end at a distal end of the arm, and an elongated portion inward from the widened end.

11. The vessel of claim 10, wherein the ribbed structure forms one or more channels between neighboring arms, wherein the one or more channels are configured to allow flow of the contents of the vessel from the first chamber towards an opening of the valve.

12. The vessel of claim 11, wherein the one or more channels have a width of less than or equal to two millimeters.

13. The vessel of claim 9, wherein the ribbed structure comprises a raised portion extending from each arm of the plurality of arms.

14. The vessel of claim 13, wherein the raised portions have a maximum width that is less than a diameter of the opening of the valve.

15. The vessel of claim 11, wherein the one or more flow paths created by the one or more ribs are configured to allow flow of the contents of the vessel into the one or more channels formed by the ribbed structure.

16. A vessel, comprising:
- a body comprising an interior surface;
- a liner that engages with at least a portion of the interior surface, the liner having an inner surface that defines an interior space of the vessel;
- a flexible membrane located within the interior space of the vessel, wherein the flexible membrane divides the interior space of the vessel into a first chamber and a second chamber;
- a valve configured to provide selective fluid communication between the first chamber and an exterior of the vessel; and
- one or more ribs protruding and extending from the inner surface of the liner into the first chamber, wherein the one or more ribs create one or more flow paths within the first chamber configured to allow flow of a contents of the vessel from the first chamber towards an opening of the valve when the flexible membrane is in contact with the one or more ribs, wherein the one or more ribs extend outwards from a center portion proximate to the opening of the valve, wherein the center portion has a reduced depth compared to the one or more ribs.

17. The liner of claim 16, wherein the one or more ribs are a plurality of ribs, and each rib of the plurality of ribs is arranged at a constant angle from its respective neighboring ribs.

18. The liner of claim 16, wherein the flexible membrane comprises:
- a first surface that defines a portion of the first chamber;
- a second surface that defines a portion of the second chamber; and
- a ribbed structure extending from the first surface of the flexible membrane.

19. The vessel of claim 18, wherein the ribbed structure comprises a base portion that includes a plurality of arms extending outwards from a center hub.

* * * * *